(12) United States Patent
Smith et al.

(10) Patent No.: US 7,402,776 B2
(45) Date of Patent: Jul. 22, 2008

(54) DEVICE AND SYSTEM FOR HEATING A MOBILE ELECTRONIC DEVICE

(75) Inventors: Alton Smith, Woodstock, GA (US);
Gregory Carras, Woodstock, GA (US);
Hayden Eastman, Duluth, GA (US);
Keith Linker, Brookhaven Hamlet, NY (US); Andrew M. Doorty, Stony Brook, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 18 days.

(21) Appl. No.: 11/451,860

(22) Filed: Jun. 13, 2006

(65) Prior Publication Data
US 2007/0284364 A1    Dec. 13, 2007

(51) Int. Cl.
*H05B 3/28*    (2006.01)
*G03B 17/00*    (2006.01)

(52) U.S. Cl. .................. 219/209; 219/210; 219/522; 219/523; 219/541; 219/543

(58) Field of Classification Search .......... 219/268, 219/527, 533, 201, 217, 528, 535, 538, 548, 219/552; 361/679, 704, 818; 307/3
See application file for complete search history.

(56) References Cited

U.S. PATENT DOCUMENTS

| | | | | |
|---|---|---|---|---|
| 5,285,050 | A | * | 2/1994 | Blackburn ............ 219/268 |
| 5,973,302 | A | * | 10/1999 | Petrosino ............ 219/527 |
| 6,008,475 | A | * | 12/1999 | Aakalu et al. ........ 219/209 |
| 2004/0232768 | A1 | * | 11/2004 | Hung et al. ........... 307/3 |
| 2005/0111194 | A1 | * | 5/2005 | Sohn ................... 361/704 |
| 2006/0289464 | A1 | * | 12/2006 | von der Luhe et al. ... 219/505 |

FOREIGN PATENT DOCUMENTS

| | | | |
|---|---|---|---|
| JP | 55127531 | A * | 10/1980 |
| JP | 10290710 | A * | 11/1998 |

\* cited by examiner

*Primary Examiner*—Joseph M Pelham
(74) *Attorney, Agent, or Firm*—Fay Kaplan & Marcin, LLP

(57) ABSTRACT

Described is a device and system for heating an electronic mobile device. The system includes a mobile electronic device including a power supply arrangement and a removable heating arrangement detachably coupled to the mobile electronic device. When the heating arrangement is coupled to the mobile electronic device, the arrangement draws power from the power supply arrangement to generate heat.

29 Claims, 2 Drawing Sheets

DEVICE AND SYSTEM FOR HEATING A MOBILE ELECTRONIC DEVICE

FIELD OF INVENTION

The present invention relates generally to a device and system for heating a mobile electronic device.

BACKGROUND

Handheld portable systems such as mobile electronic devices ("MEDs") may be used in both indoor and outdoor environments. In certain instances, the MED may be used in an extremely low temperature environment (e.g., a shipping yard in the winter, an industrial freezer, etc.). When the user is operating the MED in the low temperature environment, the user expects the MED to operate as effectively as it does in average temperature environments. However, in the low temperature environment, the functionality of certain components of the MED may be significantly degraded or possibly terminated. For example, when subjected to the low temperature environment, an internal circuitry, a battery, and/or a display screen of the MED may experience impaired performance. The circuitry may develop frost or condensation; the chemical reactions within a battery may proceed at a reduced rate; the display screen may fade or exhibit a delayed response time.

In addition, only a small percentage of a total number of MEDs owned by the user may be subjected to the low temperature environment. Thus, it would be advantageous to have a single model of the MED which is adaptable to maintain unimpaired operation in the low temperature environment.

SUMMARY OF THE INVENTION

The present invention relates to a device and system for heating an electronic mobile device. The system comprises a mobile electronic device including a power supply arrangement and a removable heating arrangement detachably coupled to the mobile electronic device. When the heating arrangement is coupled to the mobile electronic device, the heating arrangement draws power from the power supply arrangement to generate heat.

DETAILED DESCRIPTION

Figure 1:
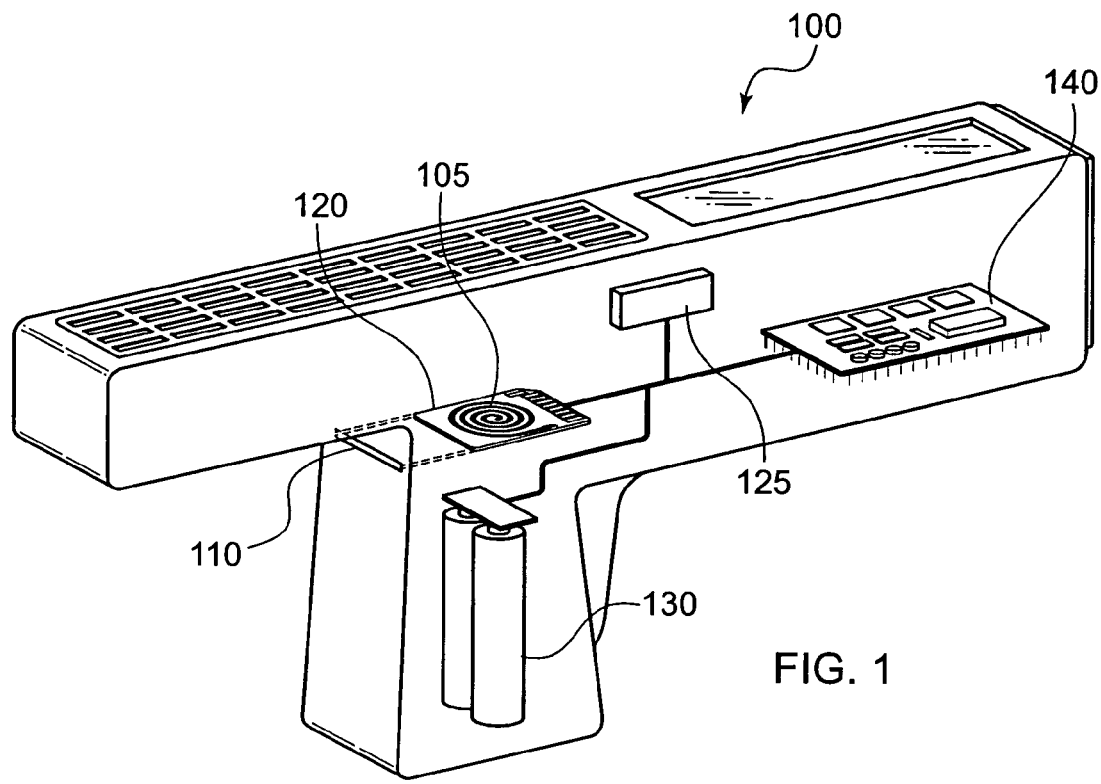
FIG. 1 shows an exemplary embodiment of a mobile electronic device according to the present invention.

The present invention may be further understood with reference to the following description and the appended drawings, wherein like elements are referred to with the same reference numerals. The present invention describes a device and system for heating a mobile electronic device ("MED") using a heating assembly ("HA"). In the exemplary embodiments, the HA is electrically coupled to a receiving assembly ("RA") of the MED, and the HA is utilized to manage an internal temperature of the MED. Heat produced by the HA may be used to counter negative effects resulting from operation of the MED in a low temperature environment. In one exemplary embodiment, the HA is a removable component detachably coupleable to the MED. This allows the MED to maintain optimal performance without the added cost of purchasing a separate model of MED specifically configured for the low temperature environment.

FIG. 1 shows an exemplary embodiment of an MED 100 according to the present invention. The MED 100 may include, for example, a laser-based scanner, an imager-based scanner, an RFID reader, a mobile phone, a digital camera, a digital media player, a PDA, etc.

The MED 100 includes a processor 140 and other electronic circuitry which draw power from a power supply arrangement (e.g., a battery 130). The battery 130 may be a rechargeable battery (or single use battery) which is detachably coupled to the MED 100. In addition, the MED 100 provides an RA 110 which, in the exemplary embodiment, is a slot or sleeve for receiving a standard size card (e.g., SD card, SIM card, PCMCIA card, CF card, etc.). As is known in the art, the RA 110 provides electrical connectors for data and power transfer between a card inserted therein and the MED 100. That is, the card can communicate with the processor 140 and may also draw power from the battery 130. In the exemplary embodiment, the RA 110 is in a centrally located position with respect to the MED 100 for reasons which are discussed below.

The exemplary embodiment also provides an HA 120 for use with the MED 100. The HA 120, embodied as a standard size card for example, is removably coupleable to the MED 100 via the RA 110. When coupled to the MED 100, the HA 120 draws power from the battery 130 via the electrical connectors in the RA 110. The power activates components of the HA 120 which produce heat to increase/stabilize the internal temperatures of the MED 100. In one exemplary embodiment, the RA 110 is centrally located relative to the MED 100 so that the heat produced by the HA 120 effectively reaches each of the MED's components and inhibits the formation of condensation and/or frost.

The MED 100 may further include a temperature control assembly ("TCA") 125 which monitors and regulates an amount of electric current delivered to the HA 120 by the battery 130. Based on a temperature(s) measured by the TCA 125, the TCA 125 controls activation and deactivation of the HA 120, ensuring that the internal temperature of the MED 100 remains within a predefined temperature range. In addition, the TCA 125 may be used to prevent the HA 120 and the components of the MED 100 from overheating.

Figure 2A:
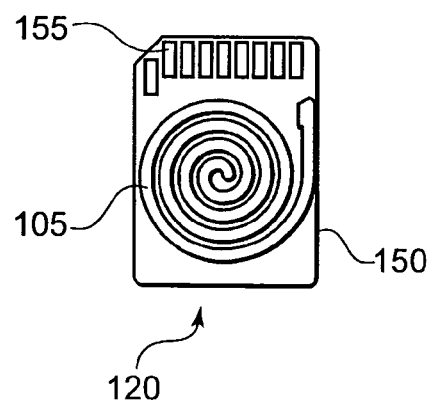
FIG. 2A shows an exemplary embodiment of a heating arrangement according to the present invention.

FIG. 2A shows an exemplary embodiment of the HA 120 according to the present invention. As noted above, the HA 120 may be a removable hardware device comprising a housing 150 and a heating source 105. The HA 120 may be, for example, a secure digital ("SD") card, a mini SD card, a flash memory card, a smart media card, a memory stick, a Personal Computer memory card ("PC card"), a Personal Computer Memory Card Industry Association card ("PCMCIA card"), a subscriber identity module ("SIM") card or any removable integrated circuit ("IC") card that may be received by the RA 110. When the HA 120 is in electrical contact with the MED 100 via the RA 110, the HA 120 draws power from the battery 130 to power the heating source 105. The HA 120 may draw the power from the battery 130 upon being inserted, or when inserted and the MED 100 is powered on.

The heating source 105 of the HA 120 may be, for example, a resistive strip laid in a predetermined configuration (e.g., a spiral) on the housing 150. In another exemplary embodiment, the heating source 105 is a high-power dissipation resistor. In the exemplary embodiment shown in FIG. 2*a*, an electrical connector 155 (e.g., a 9-pin head) may be disposed on the housing 150 for electronically connecting the HA 120 to the MED 100. The battery 130 may provide a regulated voltage through the RA 110 for powering the HA 120. When an electric current is passed through the resistive strip, heat may be produced and radiated by the HA 120, increasing an internal temperature of the MED 100. Thus, the HA 120 may provide a removable device for selectively increasing the internal temperature of the MED 100.

The HA 120 may further include a fuse (not shown) to limit the electric current provided to the heating source 105. The fuse may be capable of withstanding a small current rush to limit the electrical intake of the HA 120 and preserve the battery 130 of the MED 100. In the exemplary embodiment, the HA 120 is provided with a predetermined current (e.g., approximately 0.5 amperes) at a predetermined voltage (e.g., approximately 3.3) from the battery 130.

Figure 2B:
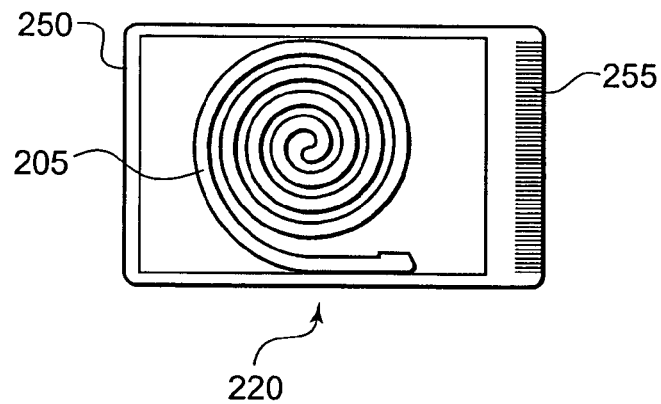
FIG. 2B shows another exemplary embodiment of a heating arrangement according to the present invention.

FIG. 2B shows another exemplary embodiment of an HA 220 according to the present invention. In this exemplary embodiment, a housing 250 of the HA 220 may conform to dimensions of a PC card, which provides an electrical connector 255 (e.g., a 68-pin head) that is electronically connectable to the RA 110 of the MED 100. Those of skill in the art will understand that the heating source 105 may be provided on any device which is removably connectable to the MED 100.

Figure 3:
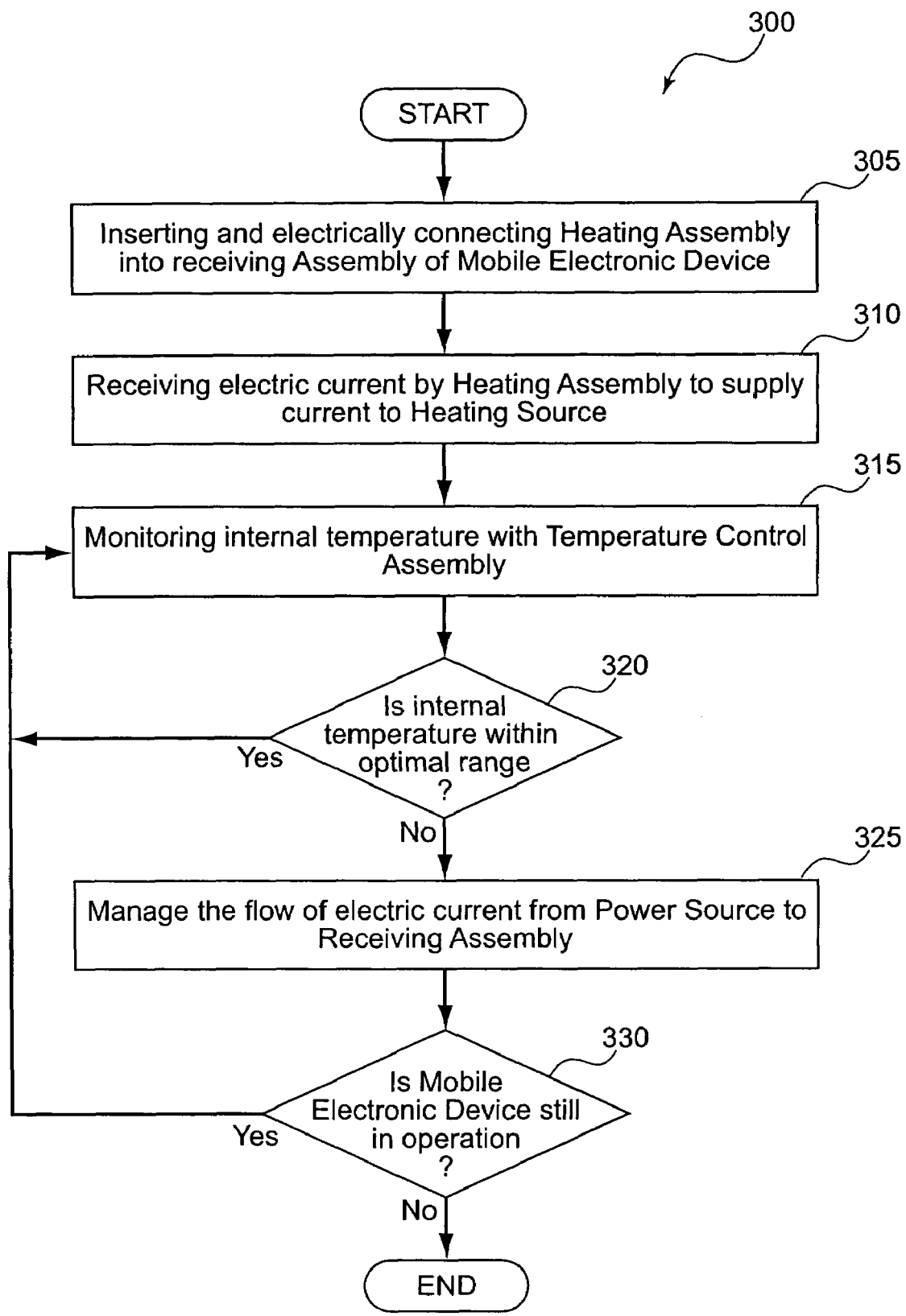
FIG. 3 shows an exemplary embodiment of a method for controlling an internal temperature of a mobile electronic device according to the present invention.

FIG. 3 shows an exemplary embodiment of a method 300 for optimizing the internal temperature of the MED 100 according to the present invention. In step 305, the HA 120 is coupled to the RA 110 of the MED 100. For example, the HA 120 may be a removable card and the RA 110 may be a card-receiving slot on the MED 100. As described above, the RA 110 provides an electrical connection for the HA 120 so that the HA 120 may be electrically coupled to the MED 100 and its components (e.g., the processor 140, the battery 130, etc.). Thus, the HA 120 may provide an electric current to the heating source 105.

In step 310, the HA 120 receives the electric current from the battery 130. The electric current is delivered to and activates the heating source 105, which generates heat. In an exemplary embodiment, a user of the MED 100 may manually activate the HA 120. For example, the MED 100 may be used in an indoor, temperature-regulated environment in which the heat provided by the HA 120 is unnecessary. Thus, the HA 120 may be deactivated (or rejected from the RA 110) to prevent waste of the battery 130. However, when the MED 100 is used in the low temperature environment, the user may activate (or insert) the HA 120, or, alternatively, the TCA 125 may activate the HA 120 automatically based on the internal temperature of the MED 100, as described below.

In step 315, the TCA 125 monitors the internal temperature of the MED 100 to ensure that the internal temperature remains within a predetermined temperature range. Thus, the TCA 125 detects any change in the internal temperature of the MED 100 and the predetermined range.

In step 320, the TCA 125 determines whether to activate/deactivate the HA 120 based on the internal temperature of the MED 100. When the internal temperature is within the predetermined range, the TCA 125 may return to step 315 and continue monitoring the internal temperature of MED 100. However, when the internal temperature is outside of the predetermined range, the TCA 125 may activate/deactivate the HA 120. For example, when the internal temperature is lower than a lower limit of the predetermined range, the TCA 125 activates the HA 120 because the MED 100 is in the low temperature environment. When the internal temperature is greater than an upper limit of the predetermined range, the TCA 125 deactivates the HA 120 because the MED 100 may overheat and/or components may be damaged.

In step 325, the electric current provided to the HA 120 is managed based on the determination in step 320. In order to prevent the battery 130 from being depleted too rapidly, and to prevent the heating source 105 from overheating, the MED 100 may implement circuitry to regulate the electric current provided to the HA 120 via the RA 110. Furthermore, to prevent a current rush, the fuse may be utilized to limit the electric current provided to the HA 120.

In step 330, a determination is made as to whether the MED 100 is still in operation. If the MED 100 is still in operation, the method 300 may return to step 315 in which the TCA 125 continues to monitor the internal temperature. If the MED 100 is switched off, the TCA 125 may discontinue monitoring the internal temperature. Thus, as long as the MED 100 is in use, the TCA 125 may continue to monitor the internal temperature of the MED 100.

According to an alternative embodiment of the present invention, the battery 130 may work in conjunction with a smart battery application program interface ("API") for power management of the MED 100. The smart battery includes an integrated circuit (IC) which generates battery data including power status updates and other battery specific characteristics that may be utilized by the MED 100. In the exemplary embodiment, the TCA 125 and/or the processor 140 may utilize the battery data to perform power management functions, such as allocating power to various resources of the MED 100.

The smart battery may monitor a battery temperature, allowing the processor 140 to selectively activate and deactivate the HA 120. Specifically, the smart battery may send a temperature value to the processor 140 which enables/disables the current flow to the HA 120 based on the temperature value. Thus, the use of the smart battery may provide the MED 100 with advanced power management capabilities for controlling its internal temperature. Those of skill in the art will understand that in addition to smart battery API, other solutions may be used to manage the power output of the battery 130, such as a speed-step processor and/or a power application-specific integrated circuit ("ASIC").

In alternate embodiments of the present invention, the RA 110 may be positioned adjacent to a predetermined component of the MED 100 so that the heat generated by the HA 120 is focused on the predetermined component. For example, the RA 110 may be placed adjacent a display screen of the MED 100, because, when the MED 100 is used in moist/humid environments, the display screen may fog, interfering with the user's ability to read the display screen. Furthermore, if the display screen is a liquid crystal display ("LCD"), the LCD may fade and/or respond slowly when placed in the low temperature environment. In addition, saline and liquid crystal of the LCD may crack or freeze. Thus, when the HA 120 is coupled to the RA 110, the heat generated by the HA 120 is focused on the display screen, improving its functionality and preventing damage.

In an alternative exemplary embodiment, the RA 110 may be positioned adjacent the battery 130. In the low temperature environment, chemical reactions generating the electric current within the battery 130 occur at a slower rate, reducing output of the electric current. Thus, when the HA 120 is coupled to the RA 110, the heat generated by the HA 120 significantly impacts the battery 130, improving its functionality.

Those of skill in the art will understand that the exemplary embodiments of the present invention provide an inexpensive solution to maintaining operational efficiency of MEDs which are used in low temperature environments and/or moist/humid environments.

It will be apparent to those skilled in the art that various modifications may be made in the present invention, without departing from the spirit or the scope of the invention. Thus, it is intended that the present invention cover modifications and variations of this invention provided they come within the scope of the appended claimed and their equivalents.

What is claimed is:

1. A system, comprising:
    a mobile electronic device including a power supply arrangement; and
    a removable heating arrangement detachably coupled to the mobile electronic device,
    wherein, when the heating arrangement is coupled to the mobile electronic device, the heating arrangement draws power from the power supply arrangement to generate heat, and wherein the heating element is insertable into an assembled housing of the mobile electronic device to be detachably coupled to the power supply arrangement.

2. The system according to claim 1, wherein the power supply arrangement is a battery.

3. The system according to claim 1, wherein the mobile electronic device includes at least one of a laser-based scanner, an imager-based scanner, an RFID reader, a mobile phone, a PDA, a laptop, a tablet computer, a digital media player and a digital camera.

4. The system according to claim 1, wherein the mobile electronic device includes a receiving arrangement detachably receiving the heating arrangement.

5. The system according to claim 4, wherein the receiving arrangement is located adjacent to at least one of the power supply arrangement and a processor of the mobile electronic device.

6. The system according to claim 4, wherein the receiving arrangement is one of a card slot and a USB port.

7. The system according to claim 1, wherein the heating arrangement is one of an SD card, a mini SD card, a SIM card, smart media card, a PCMCIA card, a CF card, a memory stick, a PC card, an IC card and a USB device.

8. The system according to claim 1, wherein the mobile electronic device includes a temperature control arrangement monitoring a temperature of the power supply arrangement.

9. The system according to claim 8, wherein the temperature control arrangement activates the heating arrangement when the temperature of the power supply arrangement is less than a first predetermined value and deactivates the heating arrangement when the temperature of the power supply arrangement is greater than a second predetermined value.

10. The system according to claim 1, wherein the heating arrangement includes an electrical connector and a heating element, the electrical connector electrically coupling to a complementary electrical connector of the mobile electronic device for receiving the power from the power supply arrangement, the heating element generating heat using the power.

11. The system according to claim 10, wherein the heating element is one of (i) a resistive strip and (ii) a high-power dissipation resistor.

12. The system according to claim 11, wherein the resistive strip is disposed in a spiral pattern on an outer surface of the heating arrangement.

13. The system according to claim 10, wherein the heating arrangement includes a fuse terminating the power supplied to the heating element when the power is greater than a predetermined threshold value.

14. The system according to claim 13, wherein the predetermined threshold value is approximately 0.5 Amperes at 3.3 Volts.

15. The system according to claim 1, wherein the heating arrangement lacks a data output.

16. The system according to claim 1, wherein the heating arrangement can be removed from the mobile electronic device without disassembling the mobile electronic device.

17. An arrangement, comprising:
    an electrical connector coupled to a corresponding electrical connector of a mobile electronic device; and
    a removable heating element generating heat using a power obtained from the mobile electronic device via the electrical connector,
    wherein the heating element is insertable into an assembled housing of the mobile electronic device to be detachably coupled to the electrical connector of the mobile electronic device.

18. The arrangement according to claim 17, wherein the power is obtained from a power supply arrangement of the mobile electronic device.

19. The arrangement according to claim 18, wherein the power supply arrangement is a battery.

20. The arrangement according to claim 17, further comprising:
    a fuse terminating receipt of the power when the power is greater than a predetermined threshold value.

21. The arrangement according to claim 20, wherein the predetermined threshold value is approximately 0.5 Amperes at 3.3 Volts.

22. The arrangement according to claim 17, wherein the arrangement is one of an SD card, a mini SD card, a SIM card, smart media card, a PCMCIA card, a CF card, a memory stick, a PC card, an IC card and a USB device.

23. The arrangement according to claim 17, wherein the heating element is one of (i) a resistive strip and (ii) a high-power dissipation resistor.

24. The arrangement according to claim 23, further comprising:
    a housing, and
    wherein the resistive strip is disposed in a spiral pattern on an outer surface of the housing.

25. The arrangement according to claim 17, wherein heating element lacks a data output.

26. The arrangement according to claim 17, wherein the heating element can be removed from the mobile electronic device without disassembling the mobile electronic device.

27. An arrangement, comprising:
    an electrical connection means for coupling to a corresponding electrical connector of a mobile electronic device; and
    a removable heating means for generating heat using a power obtained from the mobile electronic device via the electrical connection means,
    wherein the heating means is insertable into an assembled housing of the mobile electronic device to be detachably coupled to the electrical connector of the mobile electronic device.

28. The arrangement according to claim 27, wherein the heating means lacks a data output.

29. The arrangement according to claim 27, wherein the heating means can be removed from the mobile electronic device without disassembling the mobile electronic device.

* * * * *